3,065,137
CHALCOMYCIN AND ITS FERMENTATIVE PRODUCTION

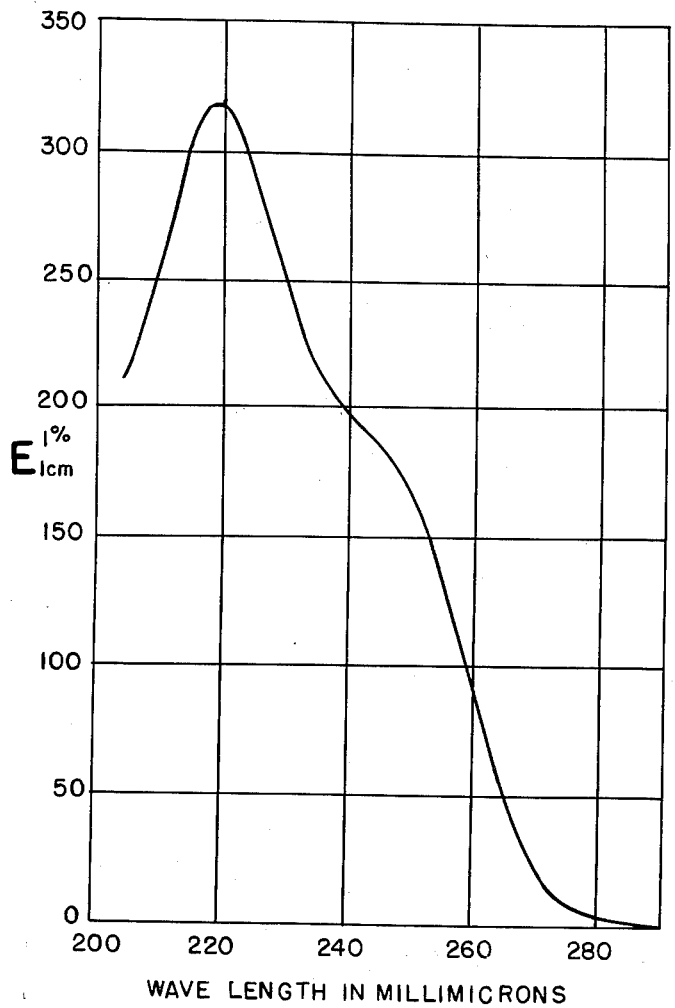
FIG. I. ULTRAVIOLET SPECTRUM OF CHALCOMYCIN

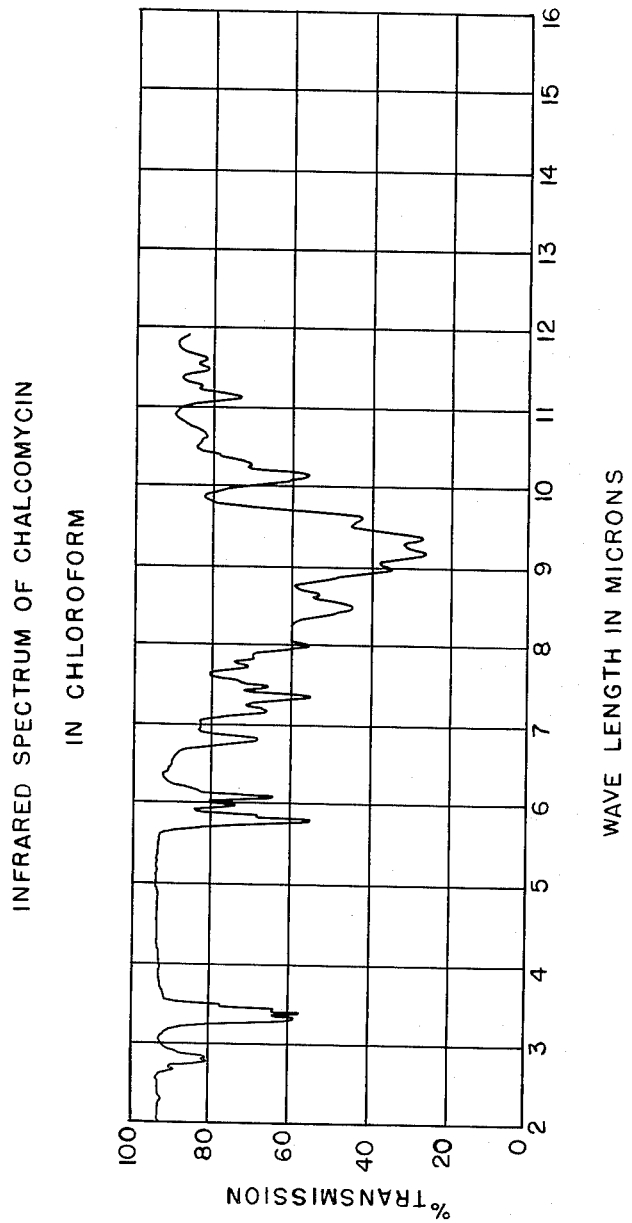

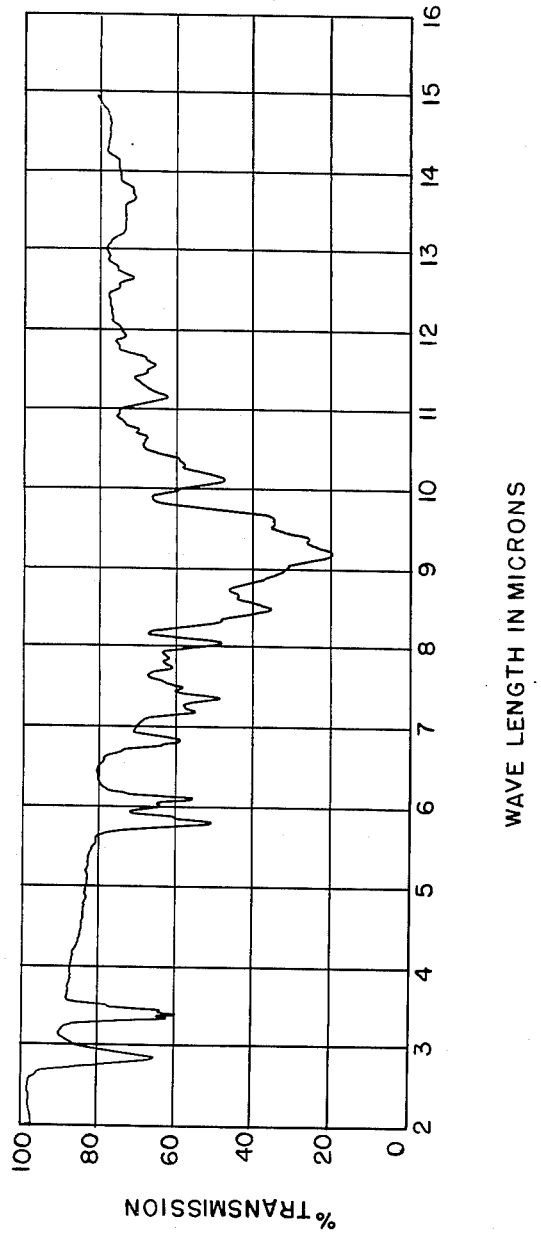

Roger P. Frohardt, Royal Oak, Robert F. Pittillo, Grosse Pointe, and John Ehrlich, Grosse Pointe Park, Mich., assignors to Parke, Davis & Company, Detroit, Mich., a corporation of Michigan
Filed Feb. 2, 1959, Ser. No. 790,689
4 Claims. (Cl. 167—65)

The present invention relates to a new chemical substance called chalcomycin. More particularly, it relates to chalcomycin, to a process for its production by the fermentation of selected Streptomyces organisms under artificial conditions, to methods for its isolation from the resulting fermentation mixtures, to methods for its purification, to its physical and chemical characterization and to its use in antibacterial applications.

Chalcomycin is a neutral white crystalline compound containing only the elements carbon, hydrogen and oxygen. It is soluble in alkyl esters of lower fatty acids such as ethyl acetate and amyl acetate, in lower alkanols such as methanol and ethanol, in aromatic hydrocarbons such as toluene and benzene, in ethylene dichloride and in chloroform; slightly soluble in carbon tetrachloride, in water and in ether; and relatively insoluble in petroleum ether.

Chalcomycin is optically active, having a specific rotation $[\alpha]_D^{27} = -43.5°$ (c.=1% in ethanol). The melting point is variable with the rate of heating and the apparatus used, but on a heated block a value of 121–123° C. is observed. Chalcomycin contains about 60% carbon (range of experimentally determined values 59.50% to 59.97%); about 8% hydrogen (range of experimentally determined values 8.08% to 8.32%); and about 32% oxygen (range of experimentally determined values 31.43% to 32.05%). The molecular weight of chalcomycin is about 600 (range of experimentally determined values 575 to 592).

In the drawings, FIGURE 1 shows the ultraviolet spectrum of chalcomycin, 0.00228% in absolute ethanol. An absorption maximum appears at 218 m$\mu$, $$E_{1\,cm.}^{1\%} = 319$$

There is a shoulder in the 240 m$\mu$ region.

The infrared absorption spectrum of chalcomycin is highly characteristic of this substance. FIGURE 2 shows the infrared spectrum of chalcomycin determined in chloroform solution. Principal absorption maxima appear at about 2.83, 3.34, 3.40, 5.83, 5.89, 6.00, 6.13, 6.86, 7.23, 7.40, 7.53, 7.78, 8.00, 8.54, 8.70, 9.00, 9.22, 9.41, 9.67, 10.20, 10.71, 11.20, 11.57 and 11.69 microns. FIGURE 3 shows the infrared absorption spectrum of chalcomycin determined in a potassium bromide disk. Principal absorption maxima appear at about 2.84, 3.35, 3.40, 5.81, 5.89, 6.02, 6.12, 6.84, 7.20, 7.38, 7.51, 7.77, 8.08, 8.52, 9.22, 9.40, 9.63, 10.15, 11.19, 11.59 and 12.70 microns.

Chalcomycin decolorizes aqueous permanganate solution at room temperature, adds bromine in a carbon tetrachloride solution at room temperature and gives a positive hydroxamate test directly. Chalcomycin gives a negative Tollens' test, a negative Fehling's test and negative iodoform test.

Chalcomycin exhibits the chemical properties of a lactone. Unsaturation and esterifiable hydroxyl groups are also present. Upon acetylation of chalcomycin with acetic anhydride in pyridine at room temperature, the crystalline compound chalcomycin diacetate is obtained.

Chalcomycin absorbs hydrogen in the presence of a noble metal catalyst under mild conditions to form a series of hydrogenation products. One of these hydrogenation products is tetrahydrochalcomycin, which is formed by hydrogenation of chalcomycin in ethanol solution at room temperature and atmospheric pressure in the presence of a palladium catalyst, and which is readily characterized as the crystalline tetrahydrochalcomycin diacetate.

The antibacterial activities of chalcomycin, solutions and compositions containing chalcomycin, and derivatives of chalcomycin are conveniently determined by measuring the inhibitory effect of such preparations against *Sarcina lutea*. The high activity which chalcomycin exhibits against this organism is lost by either acidic hydrolysis or alkaline hydrolysis, and specifically by heating chalcomycin under reflux for 10 minutes with a 1-molar solution of hydrochloric acid in aqueous methanol or by allowing it to stand at room temperature for 24 hours in 0.1-molar sodium hydroxide in aqueous methanol.

The alteration products resulting from acidic hydrolysis and alkaline hydrolysis of chalcomycin are crystalline substances useful in the further identification and characterization of chalcomycin.

The foregoing derivatives and alteration products of chalcomycin are described more fully in the examples which follow.

Chalcomycin is further characterized by means of its spectrum of antibacterial activity. The antibacterial spectrum of chalcomycin, expressed in terms of the minimum inhibitory concentration (micrograms/ml.) against a variety of microorganisms, appears in Table 1. The multiple entries given under certain species in Table 1 represent different strains of the organism and are for the purpose of illustrating the variability observed for different strains of the single species. The soy broth used in these experiments was trypticase soy broth, the composition of which is given in "Products for the Microbiological Laboratory," Fourth Edition, Baltimore Biological Laboratory, Inc., Baltimore, Maryland. High activity against an organism is shown by inhibition of the growth of the organism at a chalcomycin concentration of less than 1 microgram/ml. whereas relative inactivity against an organism is shown by inhibition of the growth of the organism only at a chalcomycin concentration of 25 micrograms/ml. or higher.

TABLE 1
*In Vitro Antibacterial Spectrum of Chalcomycin*

| Microorganism | Test medium | Days Incubation | Minimum inhibitory concentration micrograms/ml. |
|---|---|---|---|
| *Coryn. diphtheriae* | SB [1] plus serum [2] | 2 | 50.0 |
| *Diplo. pneumoniae* | SB plus serum | 1 | 0.19 |
| *Micro. pyog. aureus* | SB | 1 | 0.05 |
| *Micro. pyog. aureus* | SB | 1 | 0.19 |
| *Micro. pyog. aureus* | SB | 1 | 0.19 |
| *Micro. pyog. aureus* | SB | 1 | 0.39 |
| *Micro. pyog. aureus* | SB | 1 | 0.19 |
| *Micro. pyog. aureus* | SB | 1 | 0.78 |
| *Micro. pyog. aureus* | SB | 1 | 0.09 |
| *Micro. pyog. aureus* | SB | 1 | 0.09 |
| *Micro. pyog. aureus* | SB | 1 | 0.09 |
| *Micro. pyog. aureus* | SB | 1 | 0.39 |
| *Micro. pyog. aureus* | SB | 1 | 0.19 |
| *Micro. pyog. aureus* C. Williams. | SB | 1 | 100.0 |
| *Neisseria catarrhalis* | SB | 1 | 100.0 |
| *Sarcina lutea* | SB | 1 | 0.09 |
| *Strep. pyogenes* | SB | 1 | 0.19 |
| *Strep. pyogenes* | SB | 1 | 100.0 |
| *Strep. pyogenes* | SB | 1 | 25.0 |
| *Strep. pyogenes* | SB | 1 | 0.78 |
| *Strep. pyogenes* | SB | 1 | 25.0 |
| *Strep. salivarius* | SB | 1 | 25.0 |
| *Strep. faecalis* | SB | 1 | 100.0 |
| Strep. Group C sp. | SB | 1 | 0.78 |
| *Aerobacter aerogenes* | SB | 1 | 50.0 |
| *Brucella suis* | SB plus serum | 2 | 25.0 |
| *Esch. coli* | SB | 1 | 50.0 |
| *Klebs. pneumoniae* | SB | 1 | 12.5 |
| *Klebs. pneumoniae* | SB | 1 | 100.0 |
| *Pasteurella multocida* | SB plus serum | 1 | 50.0 |
| *Pasteurella multocida* | SB plus serum | 1 | 25.0 |
| *Proteus vulgaris* | SB | 1 | 25.0 |

See footnotes at end of table.

TABLE 1—Continued

| Microorganism | Test medium | Days Incubation | Minimum inhibitory concentration micrograms/ml. |
|---|---|---|---|
| Proteus vulgaris | SB | 1 | 25.0 |
| Pseudomonas species | SB | 1 | 25.0 |
| Pseudomonas aeruginosa | SB | 1 | 52.0 |
| Salm. typhimurium | SB | 1 | 50.0 |
| Salm. typhimurium | SB | 1 | 50.0 |
| Salm. paratyphi | SB | 1 | 50.0 |
| Salm. typhosa | SB | 1 | 100.0 |
| Serratia marcescens | SB | 1 | 50.0 |
| Shigella sonnei | SB | 1 | 50.0 |
| Myco. smegmatis | Synthetic | 7 | 50.0 |
| Myco. tuberculosis | Synthetic | 7 | 25.0 |
| Myco. tuberculosis | Synth. plus serum | 7 | 50.0 |

[1] SB = Soy broth.  [2] 10% (v./v.).

Chalcomycin can be prepared in accordance with the invention by cultivating a selected chalcomycin-producing strain of the organism *Streptomyces bikiniensis* under artificial conditions in a suitable nutrient medium until substantial antibacterial activity is imparted to the medium. Following the period of cultivation or incubation, chalcomycin can be obtained from the medium by procedures described hereinafter and can be subjected to the degree of further purification desired.

The term "chalcomycin-producing strain of *Streptomyces bikiniensis*" as used in the present specification and claims means a strain of *Streptomyces bikiniensis* which, when propagated under the artificial conditions herein described, causes the formation of a beer from which chalcomycin can be obtained by the procedures set forth.

Strains of *Streptomyces bikiniensis* suitable for the production of chalcomycin have been obtained by the ultraviolet irradiation of actinomycetes obtained from Cuban soils. One such organism which can be used in the practice of our invention was derived from an actinomycete which was originally isolated by serial dilution on nutrient agar plates from a soil sample collected in a corn field in San Vicente, Cuba. This parent actinomycete produced only slight antibiotic activity against gram-negative organisms. Its capability for antibiotic production was changed by subjecting it to ultraviolet irradiation and propagating the ultraviolet survivors. The treatment was carried out as follows: The culture of the parent actinomycete was sown on a maltose agar slant and incubated for 7 days. The spores from this slant were added to 10 ml. of sterile 0.85% sodium chloride solution, and the suspension was shaken for 30 minutes. The spore suspension was placed in a sterile Petri dish with the lid removed and irradiated for one minute under a 4-watt ultraviolet germicidal lamp with the bulb placed 4½ inches from the suspension. The irradiated suspension was plated on Anderson's maltose agar and incubated for 7 days at 28° C. The plates were refrigerated for 10 days and then single colonies were selected and transferred to slants prepared with Anderson's maltose agar. The slants were incubated for 8 days at 28° C. The actinomycete obtained from one of these slants is one of the strains of *Streptomyces bikiniensis* useful in producing chalcomycin in accordance with the invention. Other such strains as will be indicated hereinafter can also be obtained in the same manner.

Cultures of this organism have been deposited with the United States Department of Agriculture, Northern Utilization Research and Development Division, Peoria, Illinois, and are being maintained in their permanent culture collection as NRRL 2737.

The organism is an aerobic and aerially sporulating member of the order Actinomycetales and belongs to the genus Streptomyces as described in the seventh edition of Bergey's Manual of Determinative Bacteriology. Its macroscopic cultural characteristics on media useful for identification of members of this genus are shown in Table 2.

TABLE 2

*Macroscopic Cultural Characteristics of Chalcomycin-Producing Strains of* Streptomyces bikiniensis *Corresponding to NRRL 2737*

| Culture medium | Color of— | | | Other features |
|---|---|---|---|---|
| | Aerial mycelium | Substratal mycelium | Substrate | |
| Glycerol asparagine agar | White to gray | White to yellow to gray | Unchanged | Colonies convex to pulvinate, margin spreading, filamentous. |
| Starch synthetic agar | do | Tan to gray | do | Moderate hydrolysis. |
| Calcium malate agar | do | Yellow | do | Do. |
| Czapek dox agar | White | White | do | Poor growth. |
| Nutrient agar | do | Brown-gray | Dark gray | Poor aerial growth; colonies convex; margin filamentous. |
| Glucose nutrient agar | White to gray | Yellow-gray to brown-gray | Gray | Colonies pulvinate; some with depressed centers and radial folds; margin undulate. |
| Glucose tryptone agar | do | Gray to black | Black | Do. |
| Anderson's sporulation agar | do | Brown to black | Dark brown | Colonies umbonate with depressed centers and radial folds; margin undulate to filamentous. |
| Potato slice | White | Brown-gray | Brown near growth | Poor aerial growth. |
| Glucose synthetic agar | White to gray | Tan to gray | Unchanged | Colonies convex to pulvinate; margin filamentous. |
| Gelatin | do | Brown | Dark brown | Liquified, about 1 cm. in 7 days. |
| Litmus milk | Gray | Brown-gray ring | Dark blue | Moderate peptonization. |
| Nitrate broth | | | | Reduced to nitrite. |

When the organism is cultivated on certain agar media, the aerial mycelium is at first white, later becoming gray. The aerial mycelium is velvety, occasionally slightly fluffy, and is often beaded with hyaline droplets. The substratal mycelium is white to yellow or tan, later becoming gray. On media containing complex nitrogen sources, the substratal mycelium usually becomes brown, brown-gray, or black, and a dark brown or black soluble pigment is formed in the substrate.

The aerial hyphae are hyaline, straight or wavy with occasional terminal loops being formed on some media such as glycerol asparagine agar and glucose nutrient agar. The aerial hyphae vary in length and branch heterogeneously. Distal portions of the aerial hyphae subdivide into spore chains ranging in length from approximately 10 to 200 microns. Vegetative hyphae are hyaline and approximately 0.6 to 1.4 microns wide. The spores are usually oblong, occasionally oval or spherical, and range in size from about 0.6 to 1.5 microns in diameter and from 0.8 to 2.0 microns in length.

In carbon utilization tests, good to fair growth was obtained with the following single carbon sources: dextrose, maltose, D-mannose, and starch. Poor or no growth was obtained with L-arabinose, adonitol, cellulose, i-inositol, inulin, lactose, D-mannitol, melezitose, melibiose, raffinose, rhamnose, D-sorbitol, sucrose and trehalose.

In its aerial mycelial color and in several respects in its hyphal micromorphology, the organism resembles *Streptomyces bikiniensis* as described by D. B. Johnstone and S. A. Waksman [J. Bact. 55, 317 (1948)]. In certain other characteristics, the organism differs significantly from *S. bikiniensis* as described by Johnstone and Waksman (Table 3) as well as from the *S. bikiniensis*-resembling organism described by Hamada (Table 4). Our organism is therefore regarded as a new and distinct strain of *Streptomyces bikiniensis*, the new strain being represented by culture number NRRL 2737.

TABLE 3

*Comparison of Chalcomycin-Producing Strain of Streptomyces bikiniensis Corresponding to NRRL 2737 with S. bikiniensis of Johnstone and Waksman*

| Characteristic | S. bikiniensis corresponding to NRRL 2737 | S. bikiniensis Johnstone and Waksman J. Bact., 55, 317 (1948) |
| --- | --- | --- |
| Aerial morphology | Occasional terminal loops on some media. | Not noted in description. |
| Conidia | Usually oblong, occasionally oval or spherical. | Oval. |
| Growth on Czapek synthetic agar. | Poor, white; aerial mycelium and spores formed sparsely; no droplets; no soluble pigment. | Luxuriant, white, becoming pallid neutral gray with white tinge; aerial mycelium and spores formed abundantly; superficial droplets, amber colored; soluble pigment, light brown. |
| Growth on nutrient agar. | Good with poor aerial mycelium; soluble pigment dark gray. | Luxuriant with moderate aerial mycelium; soluble pigment deep brown. |

TABLE 4

*Comparison of Chalcomycin-Producing Strain of Streptomyces bikiniensis Corresponding to NRRL 2737 With S. bikiniensis-Like Organism of Hamada*

| Characteristic | S. bikiniensis corresponding to NRRL 2737 | S. bikiniensis-like strain F-300 Masa Hamada J. Antibiotics, Series A 10, 74 (1957) |
| --- | --- | --- |
| Conidia | Usually oblong, occasionally oval or spherical. | Elliptical. |
| Growth on Czapek synthetic agar. | Poor, white; no soluble pigment. | Thick elevated, pale yellow; soluble pigment none or yellowish gray. |
| Growth on calcium malate agar. | Yellow; aerial mycelium white to gray. | Pale yellowish brown; aerial mycelium white. |
| Growth on nutrient agar. | Aerial mycelium poor, white; soluble pigment dark gray. | Aerial mycelium none; soluble pigment blackish brown. |
| Growth on gelatin | Aerial mycelium white to gray. | Aerial mycelium pale brown. |
| Utilization of— | | |
| Rhamnose | 0 | +. |
| Sucrose | 0 | ++. |
| Lactose | ± | ++. |
| Raffinose | 0 | ++. |
| Inulin | 0 | ++. |
| Inositol | 0 | ++. |

A second chalcomycin-producing strain has been obtained from another parent actinomycete which was originally isolated by serial dilution on nutrient agar plates from another soil sample collected in Cuba. The ultraviolet survivor of this parent culture, obtained in the same manner as the organism corresponding to NRRL 2737, has also been found useful in the production of chalcomycin. Cultures of this second chalcomycin-producing organism have been deposited with the United States Department of Agriculture, Northern Utilization Research and Development Division, Peoria, Illinois and are being maintained in their permanent culture collection as NRRL 2738.

Taxonomically the organisms corresponding to NRRL 2737 and NRRL 2738 are very similar although they exhibit some differences in chalcomycin production as illustrated in the examples to follow.

According to the present invention, chalcomycin is produced by inoculating a sterile, aqueous nutrient medium with a chalcomycin-producing strain of *Streptomyces bikiniensis*, conducting a fermentation under aseptic, aerobic conditions at a temperature between about 20 and 35° C. until substantial antibacterial activity has been imparted to the fermentation mixture, and isolating the desired chalcomycin from the fermentation mixture.

For the inoculation, spores or conidia of the selected culture of *Streptomyces bikiniensis* can be used. Aqueous suspensions of the spores or conidia containing a small amount of soap or another wetting agent can be conveniently employed. For large fermentations, it is preferable to use vigorous, young, aerated and agitated broth cultures of the microorganism.

Suitable aqueous nutrient media are those containing assimilable sources of carbon and nitrogen and preferably having a pH between about 6 and 8.5. Sources of carbon which are assimilable and satisfactory for use include pure carbohydrates which can be utilized by the organism as well as commercially-available carbohydrate mixtures. Some examples of the materials which are suitable for this purpose are glucose, maltose, mannose, starch and modified starches, corn syrup, malt liquors, blackstrap molasses, glycerol and the like. The quantity of the carbohydrate present in the nutrient medium is not particularly critical and can vary from about 0.5 to 5% by weight of the medium. Quantities somewhat outside of this range can also be used.

The sources of nitrogen in the nutrient medium can be of an organic, inorganic or mixed organic-inorganic nature. Some examples of the many nitrogenous substances which can be employed in the nutrient medium are amino acids, peptones, hydrolyzed and unhydrolyzed proteins, fish meal, soybean meal, corn steep liquor, dehydrated corn steep liquor, meat extracts, peanut meal, inorganic nitrates, urea, ammonium salts and the like. Due to the crude nature of most of the readily-available nitrogen sources, the quantity to be added to the medium varies according to the purity and it is not readily possible to specify a definite quantity of nitrogenous source material which should be added to the medium. However, it can be said that for practical purposes nitrogenous materials need not exceed 6% by weight of the total fermentation medium and can be present in a considerably lower amount.

The presence of a certain amount of mineral salts and traces of growth factors of unknown composition is desirable in order to obtain the best yields of chalcomycin. Many readily-available crude materials such as corn steep liquor, butanol-acetone fermentation residues, yeast preparations, soybean oil meal, and other products of like character contain such inorganic salts and growth factors and the inclusion of one or more of these materials in the fermentation medium is desirable. In order to ensure the presence of adequate amounts of the mineral components of the medium, it is also advantageous in many cases to add some inorganic salts such as sodium chloride, sodium bicarbonate, calcium carbonate, sodium acetate and the like. The preferred concentration of mineral salts is between 0.1 and 1% by weight of the nutrient medium.

The cultivation of the selected strain of *Streptomyces bikiniensis* in the aqueous nutrient medium can be carried out in a number of different ways. For example, the organism can be cultivated under aerobic conditions on the surface of the medium; or it can be cultivated beneath the surface of the medium, that is in the submerged condition, provided that an adequate supply of oxygen is furnished.

The preferred method for producing chalcomycin on a large scale is by the fermentation of a chalcomycin-producing strain of *Streptomyces bikiniensis* in a submerged or deep culture. According to this embodiment of the invention, a sterile aqueous nutrient medium is inoculated with the selected culture and incubated with agitation and aeration at a temperature between about 20 and 35° C., preferably in the neighborhood of 23–30° C., until a high concentration of chalcomycin is present in the culture liquid. The length of time required for the maximum yield of chalcomycin varies with the size and type of equipment used, the rates of agitation and aeration, the specific organism culture and other factors. In large scale commercial fermentations carried out in the tank-type fermentors, maximum production of chalcomycin is usually reached at about 1 to 4 days. Shorter fermentation periods can also be used, but usually produce a lower yield of chalcomycin. When the fermentation is carried out in shaken flasks, the time required for maximum production of chalcomycin may be somewhat longer than when large fermentation tanks are used.

Under the submerged culture conditions, the microorganism develops as relatively discrete particles dispersed throughout the nutrient medium in contrast to the relatively continuous pellicle present on the surface of the medium in the surface culture method. By virtue of this distribution of the organism throughout the medium, large volumes of the inoculated nutrient medium can be used in the cultivation of the organism in the tanks and vats customarily employed in the fermentation industry. Stationary vat fermentors equipped with agitation and aeration devices are particularly suitable for large-scale production of chalcomycin, although fermentation equipment of other designs can also be used. For the preparation of smaller quantities of chalcomycin or for the production of cultures of the organism to be used as inoculum for large-scale fermentations, the submerged culture method can be carried out in small flasks or jars which are either shaken or stirred by suitable mechanical means.

In the submerged culture method, agitation and aeration of the culture mixture can be accomplished in a number of ways. Agitation can be provided by turbines, paddles, impellers or other mechanical agitation devices, by revolving or shaking the fermentor itself, by various pumping devices or by the passage of air or oxygen through the medium. Aeration can be brought about by injecting air or oxygen into the fermentation mixture through open pipes, perforated pipes, or pipes containing a porous diffusion section; or it can be brought about by spraying, splashing or spilling the medium into or through an oxygen-containing atmosphere.

An alternative to the preferred submerged culture method is the surface culture method of producing chalcomycin, according to which a shallow layer, usually less than 2 cm., of a sterile, aqueous nutrient medium is inoculated with a chalcomycin-producing strain of *Streptomyces bikiniensis* and the inoculated mixture is incubated under aerobic conditions at a temperature between about 20 and 35° C. The product is then isolated in a manner similar to that to be described for the submerged culture method.

The quantity or concentration of chalcomycin present after the fermentation period or at any time during the fermentation period can be determined by bioassay. For this purpose, a representative aliquot is obtained from the fermentation mixture and filtered to remove solid material. The antibiotic potency of the beer can then be determined by measuring the inhibition in the growth of the microorganism *Sarcina lutea* under conditions normally favorable to the growth of this organism. In carrying out this bioassay, a tray or plate agar culture of the test organism is prepared. Filter paper disks containing a measured amount of a measured dilution of the beer are placed against the surface of the agar culture and the inhibition in the growth of the organism is observed after an incubation period. The bioassay depends upon the fact that chalcomycin is characteristically antagonistic to the growth of the organism with the result that the zone of inhibition surrounding the filter paper disk varies with the quantity of chalcomycin dispersed in the disk. The assignment of potency is based on the dilution of the beer required to produce an arbitrarily-selected inhibition zone diameter under the standard test conditions, as described more fully in the examples which follow.

The potency of chalcomycin beers can also be determined by other methods, as by measuring the dilution of the beer required to give a 50% inhibition of growth in a turbidimetric test against *Agrobacterium tumefaciens* after a 2¾ hour incubation period at 37° C. on brain heart infusion broth medium.

After completion of the fermentation phase of the process, the desired product is present primarily in the culture liquid and is isolated from this liquid. For example, in the case of the production of chalcomycin by the submerged culture method, it is desirable to separate the mycelium by such means as filtration or centrifugation and then extract the filtered beer with a water-immiscible solvent such as ethylene dichloride, chloroform, ethyl acetate, amyl acetate or the like. The resulting extract, which contains the chalcomycin, is subjected to further processing depending on the purity desired in the final product. For example, the organic extract is washed with dilute base, dilute acid, and water and evaporated to dryness. The residue of crude chalcomycin is extracted with a non-polar solvent such as benzene and the benzene solution is poured onto a chromatography column packed with alumina. By development and elution of the column with increasingly polar solvents and solvent mixtures, eluates containing a high concentration of chalcomycin are obtained. Where desired, further purification is carried out by rechromatography, by recrystallization from solvents, by distribution between solvents, by countercurrent extraction or by a combination of these and similar means. After preliminary purification by chromatography on alumina or distribution between solvents, further purification can be accomplished by chromatography on activated carbon, optionally mixed with diatomaceous earth. Development and elution of the carbon column can be carried out with hydroxylic and ketonic solvents such as methanol or aqueous methanol and acetone or aqueous acetone.

Chalcomycin is an antibiotic of value in the treatment of bacterial infections. For example, it is active against a variety of gram-positive organisms. It is generally effective against staphylococci and pneumococci and is effective against some strains of streptococci. Chalcomycin is especially valuable in treating bacterial infections caused by many staphylococcus organisms which are resistant to other antibiotics. As a specific example of the use of chalcomycin, it can be employed in ointment form for topical application to a localized staphylococcus infection.

The invention is illustrated, but not limited, by the following examples:

EXAMPLE 1.—PREPARATION AND ASSAY OF ANTIBIOTIC BEERS CONTAINING CHALCOMYCIN

A nutrient medium having the following composition is prepared:

|   | Percent |
|---|---|
| Glucose monohydrate | 0.5 |
| Glycerol | 0.5 |
| Casein, acid hydrolysate | 0.3 |
| Peptone, enzymatic hydrolysate | 0.25 |
| Brewer's yeast | 0.1 |
| Corn steep liquor, dehydrated | 0.25 |
| Butanol-acetone fermentation residue | 0.25 |
| Soybean oil meal, solvent extracted | 0.25 |
| Sodium chloride | 0.5 |
| Calcium carbonate | 0.1 |

Tap water to make 100%.

Two liters of this medium is dispensed in 250 ml. portions into each of eight 1-liter wide mouth Erlenmeyer flasks, capped with cotton gauze and fiber and sterilized at 120° C. for 25 minutes. The flasks are allowed to cool and each is then inoculated with 0.5 ml. of a spore suspension of *Streptomyces bikiniensis* corresponding to NRRL 2737. This spore suspension is prepared from a sporulated agar slant of Anderson's maltose agar by suspending the spores in 12 ml. of a sterile 0.1% sodium heptadecyl sulfate solution. The inoculated flasks are incubated at 27° C. for 72 hours, during which time aeration and agitation are supplied by a rotary shaker describing a 2⅜" diameter circle at 160 r.p.m.

At the end of the incubation period, the chalcomycin content of the beer is determined by a paper disk-ray agar-diffusion method similar to that which has been described for the assay of viomycin by Ehrlich, Iverson and Kohberger, "Antibiotics and Chemotherapy," 1, (3):211–216 (June 1951). In adapting this method to the assay of chalcomycin, the following modifications are employed. The test organism used is *Sarcina lutea* PCI 1001 W. The inoculum for the seed layer is prepared by growing the culture on a medium such as Penassay Seed Agar (Difco) in Roux bottles at 28° C. for 18 hours. The cells are then harvested in a medium such as Penassay Broth (Difco). The compositions of Penassay Seed Agar and Penassay Broth are described in "Difco Manual of Dehydrated Culture Media and Reagents for Microbiological and Clinical Laboratory Procedures," Ninth Edition, and in "Compilation of Tests and Methods of Assay for Antibiotic Drugs," Federal Security Agency, Food and Drug Administration. Agars and broths of similar compositions can also be used. The cell suspension is then diluted with additional Penassay Broth such that a further 1:10 dilution gives 16% light transmission in a Coleman Jr. Spectrophotometer, Model 6A, at a wavelength of 555 mμ. The cell suspension obtained prior to the 1:10 dilution for spectrophotometric determination is used in the bioassay procedure.

A 1:600 dilution of this cell suspension is made in Penassay Seed Agar and 25 ml. is poured into each tray. No basal layer is employed in this test. Incubation is carried out at 37° C. for 18 hours.

The antibiotic beer obtained in this example is assigned a potency of 8 units per milliliter. This assignment of potency is based on the fact that an 8-fold dilution of the beer in pH 7.8 phosphate buffer (final buffer concentration 0.1 M) gave an arbitrarily selected average inhibition zone diameter of 13.9 mm. when tested under the foregoing assay conditions.

Based on the potency units defined in this manner, pure crystalline chalcomycin is found to assay 1025 units per mg. A unit of activity, therefore, represents about 1 microgram of chalcomycin.

In the assay of chalcomycin beers, the reference standard and the samples are diluted in pH 7.8 phosphate buffers to a final 0.1 M buffer solution. When body fluids are assayed, the reference standard and samples are diluted in the body fluid to be tested.

EXAMPLE 2.—COMPARISON OF CHALCOMYCIN PRODUCTION BY DIFFERENT CHALCOMYCIN-PRODUCING STRAINS OF *STREPTOMYCES BIKINIENSIS*

A nutrient medium (identified herein as Medium A) is prepared as follows:

| | Percent |
|---|---|
| Glucose monohydrate | 2.0 |
| Glycerol | 2.0 |
| Soybean oil meal, solvent extracted | 1.5 |
| Corn steep liquor, dehydrated | 2.0 |
| Sodium chloride | 0.5 |
| Calcium carbonate | 0.5 |
| Water to make 100%. | |

Two liters of Medium A is dispensed in 250 ml. portions into each of eight 1-liter wide mouth Erlenmeyer flasks, capped with cotton gauze and fiber and sterilized for 20 minutes at 120° C. After sterilization, the pH is about 6.6. Each cooled flask is inoculated with 1.0 ml. of a spore suspension of *Streptomyces bikiniensis* corresponding to NRRL 2737. This spore suspension is prepared from a sporulated agar slant of Anderson't maltose agar by suspending the spores in 8 ml. of a sterile 0.1% sodium heptadecyl sulfate solution. The inoculated flasks are maintained at 26° C. for a fermentation period of 96 hours. Aeration and agitation are maintained by a rotary shaker describing a 2⅜" diameter circle at 160 r.p.m. Samples are removed at intervals during the 96-hour fermentation period for antibiotic assay.

Another 96-hour fermentation is carried out in Medium A using the foregoing conditions with the exception that the inoculum is a spore suspension of *Streptomyces bikiniensis* corresponding to NRRL 2738.

A nutrient medium (identified herein as Medium B) is prepared as follows:

| | Percent |
|---|---|
| Glucose monohydrate | 0.5 |
| Glycerol | 0.5 |
| Casein, acid hydrolysate | 0.3 |
| Peptone, enzymatic hydrolysate | 0.25 |
| Brewer's yeast | 0.1 |
| Corn steep liquor, dehydrated | 0.25 |
| Butanol-acetone fermentation residue | 0.25 |
| Soybean oil meal, solvent extracted | 0.25 |
| Sodium chloride | 0.5 |
| Calcium carbonate | 0.1 |
| Water to make 100%. | |

Two liters of Medium B is dispensed in 250 ml. portions into each of eight 1-liter wide mouth Erlenmeyer flasks, capped with cotton gauze and fiber and sterilized for 20 minutes at 120° C. After sterilization, the pH is about 6.6. Each cooled flask is inoculated with 1.0 ml. of a spore suspension of *Streptomyces bikiniensis* corresponding to NRRL 2737. This spore suspension is prepared from a sporulated agar slant of Anderson's maltose agar by suspending the spores in 8 ml. of a sterile 0.1% sodium heptadecyl sulfate solution. The inoculated flasks are maintained at 26° C. for a fermentation period of 96 hours. Aeration and agitation are maintained by a rotary shaker describing a 2⅜" diameter circle at 160 r.p.m.

Another 96-hour fermentation is run in Medium B by the foregoing procedure, but using as the inoculum a spore suspension of *Streptomyces bikiniensis* corresponding to NRRL 2738.

By periodic measurements of the antibiotic potencies of the beers obtained from each of these fermentations, by the paper disk-tray agar-diffusion method of Example 1 using *Sarcina lutea* PCI 1001 W as the test organism, as well as by a turbidimetric method using *Agrobacterium tumefaciens* as the test organism, the rates of formation of chalcomycin are determined. It is found that in either Medium A or Medium B under these conditions the highest concentration of chalcomycin is reached after about three days in the case of *Streptomyces bikiniensis* corresponding to NRRL 2737 and after about four days in the case of *Streptomyces bikiniensis* corresponding to NRRL 2738. The antibiotic potency of the beer obtained from a three-day fermentation of *Streptomyces bikiniensis* corresponding to NRRL 2737 is approximately equal to the antibiotic potency of the beer obtained from a four-day fermentation of *Streptomyces bikiniensis* corresponding to NRRL 2738.

EXAMPLE 3.—PREPARATION AND ISOLATION OF CHALCOMYCIN

A nutrient medium having the following composition is prepared:

| | Percent |
|---|---|
| Glucose monohydrate | 0.5 |
| Glycerol | 0.5 |
| Casein, acid hydrolysate | 0.3 |
| Peptone, enzymatic hydrolysate | 0.25 |
| Brewer's yeast | 0.1 |
| Corn steep liquor, dehydrated | 0.25 |

| | Percent |
|---|---|
| Butanol-acetone fermentation residue | 0.25 |
| Soybean oil meal, solvent extracted | 0.25 |
| Sodium chloride | 0.5 |
| Calcium carbonate | 0.1 |

Water to make 100%.

12 liters of this medium is placed in a 30-liter stirred jar equipped with sparger, impeller, baffles and sampling line. The medium is sterilized by heating it at 121° C. for 90 minutes. A spore suspension is prepared from 2 agar slants of sporulated *Streptomyces bikiniensis* corresponding to NRRL 2737 on Anderson's maltose agar, and 20 ml. of a sterile 0.1% sodium heptadecyl sulfate solution. The spore suspension is used to inoculate the cooled fermentation medium which is then incubated at 26° C. for 46 hours. During the course of the incubation, stirring is maintained at the rate of 210 r.p.m. and air is supplied at the rate of 12 liters per minute. Antifoaming agent is added as required.

Sixty-four liters of nutrient medium having the composition given at the beginning of this example is dispensed in equal portions into each of four 30-liter stir jar fermentors. After sterilization and cooling, each is inoculated with 800 ml. of the 46-hour fermentation mixture just obtained. Incubation is carried out at 26° C. for 24 hours with stirring at 200 r.p.m. and aeration amounting to 16 liters of air per minute. Antifoaming agent is added as required. The fermentation mixtures are combined and filtered to give about 57.5 liters of beer. This beer is extracted twice with 2.25 liter portions of ethylene dichloride and the organic extract is washed successively with 2% aqueous sodium carbonate, with 0.01-normal hydrochloric acid and with water, following which the solvent is evaporated and the residue is extracted with benzene. The filtered benzene solution is poured onto a chromatography column, packed with 350 g. of alumina (pH 6.9) from a benzene slurry. After development of the column with 250 ml. of ethyl acetate, it is eluted with methanol. Individual methanol eluates are collected and the residue of each is assayed for antibiotic activity. The active eluates are combined and concentrated to dryness. A solution of the residue in 30 ml. of 18% aqueous acetone is poured on a chromatography column prepared from 5.5 g. of activated carbon. Darco G–60 can be used. The column is developed with 18% aqueous acetone and the product is collected by elution with acetone. The acetone eluates which exhibit antibiotic activity are combined and evaporated to dryness to obtain the desired chalcomycin; $[\alpha]_D^{27} = -43.5°$ (c.=1% in ethanol). By microanalysis this preparation is found to contain 59.84% carbon and 8.3% hydrogen.

EXAMPLE 4.—PREPARATION, PURIFICATION AND CHARACTERIZATION OF CHALCOMYCIN

A nutrient medium (identified herein as Medium C) is prepared as follows:

| | Percent |
|---|---|
| Casein, acid hydrolysate | 0.5 |
| Brewer's yeast | 0.5 |
| Sodium chloride | 0.5 |
| Calcium carbonate | 0.25 |
| Maltose | 1.0 |

Water to make 100%.
Sodium hydroxide solution (10-normal) to pH 7.5.

Ten gallons of Medium C is charged into a 30-gallon stainless steel fermentor. After the addition of 175 ml. of an antifoaming agent consisting of a mixture of crude lard and mineral oils containing mono- and diglycerides, the medium is sterilized for 1 hour at 121° C., cooled and then inoculated with 30 ml. of a spore suspension. The spore suspension is prepared from 3 slants of sporulated *Streptomyces bikiniensis* corresponding to NRRL 2737 by suspending the spores from each slant in 10 ml. of sterile 0.1% sodium heptadecyl sulfate solution. The fermentation mixture is incubated for 32 hours at 26° C. with aeration and agitation supplied by the introduction of a rapid stream of air at the rate of 6.5 cubic feet per minute. Additional quantities of antifoaming agent are added as required.

A second nutrient medium (identified as Medium D) is prepared as follows:

| | Percent |
|---|---|
| Glucose monohydrate | 2.0 |
| Casein, acid hydrolysate | 0.5 |
| Brewer's yeast | 0.5 |
| Sodium chloride | 0.5 |
| Calcium carbonate | 0.25 |

Water to make 100%.
Sodium hydroxide solution (10-normal) to pH 7.5.

About 300 gallons of Medium D is placed in a 500-gallon stainless steel fermentor and, after the addition of 1 liter of antifoaming agent, sterilized for 1 hour at 121° C. The medium is allowed to cool, inoculated with 10 gallons of the 32-hour fermentation mixture and then incubated for 24 hours at 26° C. Agitation is provided by a stirrer operating at 84 r.p.m. and air is introduced into the fermentation mixture at the rate of 45 cubic feet per minute. Additional antifoaming agent is added as required.

About 1200 gallons of Medium D and 10 liters of antifoaming agent are placed in a 2,000-gallon stainless steel fermentor and the mixture is sterilized for one hour at 121° C. It is then cooled and inoculated with 150 gallons of the 24-hour fermentation mixture obtained from the 500-gallon fermentor. The incubation is carried out for 40 hours at 26° C. with aeration supplied at 120 cubic feet of air per minute and additional agitation by a stirrer operating at 125 r.p.m. An additional 8.2 liters of antifoaming agent (or the amount necessary) is added as required to reduce foaming.

After the incubation period, the fermentation mixture (about 1340 gallons) is collected and filtered. The filtrate is extracted with ethyl acetate in a centrifugal counter-current extractor (such as a Podbielniak extractor) at a ratio of one part of solvent to four parts of aqueous filtrate. The ethyl acetate extract is combined with the ethyl acetate extracts obtained in the same manner from 3 similar fermentations totaling 3760 gallons of beer. The combined ethyl acetate solution is washed well with water and then the ethyl acetate is removed by volatilization and replaced with 24.1 liters of ethylene dichloride. A chromatography column of 6" diameter is packed with 18 kg. of alumina (pH 4) from an ethylene dichloride slurry. A 13.9 liter portion of the ethylene dichloride solution (removed from the solution of the fermentation product in 24.1 liters of ethylene dichloride) is dried over anhydrous sodium sulfate and then poured onto the alumina column. The column is developed and eluted by the successive addition of (a) 4.5 liters of 1:1 ethyl acetate:ethylene dichloride, (b) 18.25 liters of ethyl acetate, (c) 20 liters of 1:9 methanol:ethyl acetate, (d) 6.4 liters of 1:1 methanol:ethyl acetate, and finally (e) 8 liters of 1:1 water:ethanol. The indicated solvent ratios are by volume. The eluate from the column is collected in fractions and the fractions found to contain significant antibiotic activity by bioassay are combined and concentrated to dryness. The residue is dissolved in acetone to give a solution assaying about 60,000 units of chalcomycin per ml. of solution.

A 1.5 liter portion of this acetone solution is added to 6.5 liters of water and the resulting turbid suspension is poured on a chromatography column packed with 1.6 kg. of activated carbon and 1.6 kg. of diatomaceous earth. Materials such as Darco G–60 and Celite 545 can be used. The column is developed and eluted with aqueous acetone containing increasing concentrations of acetone and finally with acetone. The eluate is collected in fractions and the fractions exhibiting antibiotic activity are combined and concentrated to dryness. A solution of the residue in a small volume of benzene is lyophilized to obtain chalcomycin as an amorphous powder. This preparation exhibits a specific rotation, $[\alpha]_D^{27} = -43.5°$ (c.=1% in ethanol). Duplicate microanalyses show 59.72%, 59.97% carbon; 8.32%, 8.29% hydrogen.

Confirming evidence of the purity of this material is afforded by subjecting it to counter-current extraction. For example, using a 25-plate Craig counter-current extractor and a solvent system consisting of n-butanol, cyclohexane and water (9:41:50; $k=1.07$), the chalcomycin is isolated from plate No. 13. Upon microanalysis this product is found to contain 59.84%, 59.56% carbon; 8.15%, 8.08% hydrogen; 32.36% oxygen by difference. A C-methyl group analysis gives a value of 10.9%. The ultraviolet absorption spectrum in ethanol exhibits a maximum at 218 m$\mu$, $$E_{1\ cm.}^{1\%} = 319$$

and a shoulder in the 240 m$\mu$ region.

In chloroform solution, chalcomycin exhibits infrared absorption maxima at about 2.83, 3.34, 3.40, 5.83, 5.89, 6.00, 6.13, 6.86, 7.23, 7.40, 7.53, 7.78, 8.00, 8.54, 8.70, 9.00, 9.22, 9.41, 9.67, 10.20, 10.71, 11.20, 11.57 and 11.69 microns. As determined in a potassium bromide disk, the infrared absorption spectrum shows maxima at about 2.84, 3.35, 3.40, 5.81, 5.89, 6.02, 6.12, 6.84, 7.20, 7.38, 7.51, 7.77, 8.08, 8.52, 9.22, 9.40, 9.63, 10.15, 11.19, 11.59 and 12.70 microns.

EXAMPLE 5.—LARGE-SCALE PRODUCTION OF CHALCOMYCIN

A nutrient medium is prepared as follows:

| | Percent |
|---|---|
| Glucose monohydrate | 2.0 |
| Casein, acid hydrolysate | 0.5 |
| Brewer's yeast | 0.5 |
| Sodium chloride | 0.5 |
| Calcium carbonate | 0.25 |

Water (hot deionized) to make 100%.

About 1200 ml. of this medium is adjusted to pH 7.5 by the addition of 10-normal sodium hydroxide solution and 600 ml. is dispensed into each of two 2-liter Erlenmeyer flasks. After sterilization for 15 minutes at 121° C., there is added to each of the flasks 5 ml. of a spore suspension prepared by suspending the spores from 1 agar slant of sporulated Streptomyces bikiniensis corresponding to NRRL 2737 grown on Anderson's maltose agar in 10 ml. of sterile 0.1% sodium heptadecyl sulfate solution. Incubation is then carried out for 32 hours at 27° C. with agitation and aeration supplied by a rotary platform operating at 200 r.p.m. in a 2⅜″ diameter circle.

20 gallons of a medium having the foregoing composition is mixed with 175 ml. of antifoaming agent and sterilized for 62 minutes at 121° C. in a 50-gallon stainless steel fermentor. The cooled mixture is then inoculated with 200 ml. of the 32-hour fermentation product and incubated for 40 hours at 26° C. with efficient stirring and an aeration rate of 9.7 cubic feet per minute.

300 gallons of a medium having the composition given at the beginning of this example is mixed with 1 liter of antifoaming agent and sterilized for 65 minutes at 121° C. in a 500-gallon stainless steel fermentor. The cooled mixture is inoculated with 20 gallons of the 40-hour fermentation product obtained from the 50-gallon fermentor and a fermentation is carried out for 24 hours at 26° C. with agitation at 91 r.p.m. and aeration at 45 cubic feet of air per minute. Antifoaming agent is added as required; about 300 ml. is used.

About 3600 gallons of a medium having the composition given at the beginning of this example is sterilized for 66 minutes at 121° C. in a 5,000-gallon stainless steel fermentor with the addition of antifoaming agent as required. The cooled mixture is inoculated with 300 gallons of the 24-hour fermentation product obtained from the 500-gallon fermentor. Fermentation is carried out for 40 hours at 26° C. with stirring at 112 r.p.m. and aeration at the rate of 220 cubic feet of air per minute. Antifoaming agent is added as required.

The fermentation mixture (about 3800 gallons) harvested from this fermentor is filtered on two drum filters using 125–150 lbs. of diatomaceous earth as a precoat for each drum and 400–500 lbs. of diatomaceous earth as a filter aid. A product such as Celite 545 can be used. The filtered beer is extracted with one-half its volume of ethylene dichloride. This extract is combined with ethylene dichloride extracts obtained in the same manner from an additional 103,175 gallons of a similar fermentation mixture. The combined ethylene dichloride extract is concentrated to a syrup under reduced pressure at 35° C. or lower. The syrup is dissolved in 47 gallons of methanol and the solution is extracted in a centrifugal counter-current extractor with 1780 gallons of heptane saturated with methanol. The heptane extract, which contains little antibiotic activity, is discarded.

The methanolic phase is concentrated under reduced pressure at less than 20° C. to a volume of 10 gallons. A 12″ chromatography column is packed with 37.4 kg. of activated charcoal and 37 kg. of diatomaceous earth from a methanol slurry. It is satisfactory to use Darco G-60 and Celite 545. The 10 gallons of methanol solution is poured onto this chromatography column which is then developed and eluated with a total of 552 gallons of methanol and with a total of 295 gallons of acetone. The methanol eluates are collected in 11 fractions and the acetone eluates are collected in 7 fractions. Each of the 18 eluate fractions is subjected to bioassay for antibiotic activity and the fractions showing high activity are separately concentrated to dryness under reduced pressure at less than 25° C. The residues from these fractions are dissolved in tertiary butanol and the solutions are then lyophilized. The combined solid product is then recrystallized from tertiary butanol. The crystalline product is collected on a filter, washed with tertiary butanol and then dried in a vacuum at 300 microns for 56 hours. The product obtained by this method is chalcomycin containing tertiary butanol of crystallization. This tertiary butanol cannot be removed by drying at room temperature under a pressure of 100 microns for an additional week. The product obtained in this manner exhibits an ultraviolet absorption maximum at 220 m$\mu$ in absolute ethanol, $$E_{1\ cm.}^{1\%} = 294$$

The specific rotation, $[\alpha]_D^{28} = -39.5°$ (c.=1% in ethanol). Upon microanalysis, after loss of 12.77% by volatilization, the following values are observed: 59.50%, 59.78% carbon; 8.15%, 8.14% hydrogen; 31.43% oxygen; 0.32% ash.

Chalcomycin containing tertiary butanol of crystallization is found by bioassay to be approximately 85% as active against Sarcina lutea PCI 1001 W as pure chalcomycin.

In order to obtain pure chalcomycin, a 1445 g. portion of the crystalline chalcomycin containing tertiary butanol of crystallization is dissolved in 2890 ml. of absolute ethanol warmed to 55° C. Water (11,560 ml.) is added with constant agitation followed by an additional 300 ml. of ethanol. The clear solution is filtered and the filtrate is maintained at 20–24° C. for 20 hours and then at 5–8° C. for 24 hours. The large, well-defined crystals which separate are collected on a filter, washed with ice water and then dried in a vacuum. The product thus obtained is chalcomycin, which melts on a heated block at about 121–123° C., and is substantially identical in composition and physical properties to purified chalcomycin as obtained in previous examples.

EXAMPLE 6.—PREPARATION OF ANTIBACTERIAL OINTMENT CONTAINING CHALCOMYCIN

Chalcomycin (2 g.) is incorporated in a small quantity of petroleum jelly. It is satisfactory to use a high viscosity petroleum base such as Jelene 50–W. Additional petroleum jelly or Jelene 50–W is added to the dispersion in divided portions and with stirring to a total weight of 1,000 g. The ointment as thus constituted contains a 0.2% concentration of chalcomycin in the petroleum base. The ointment is then passed through a roller ointment mill with the rollers set sufficiently close to give good dispersion of the chalcomycin. The product is mixed for one hour on an ointment mixer and filled into tubes. This product is useful for the treatment of staphylococcus infections by topical administration.

EXAMPLE 7.—PREPARATION OF CHALCOMYCIN DIACETATE

A solution of 200 mg. of chalcomycin in 3 ml. of pyridine and 2 ml. of acetic anhydride is allowed to stand at about 25° C. for 48 hours and then concentrated to dryness in a vacuum. The residue is crystallized from aqueous methanol to give chalcomycin diacetate, M.P. 148.5–150° C. By microanalysis this product is found to contain 59.02%, 58.85% carbon; 7.51%, 7.67% hydrogen; 10.50%, 11.42% acetyl. The ultraviolet absorption spectrum in alcohol shows a maximum at 217 m$\mu$, $$E^{1\%}_{1\,cm.} = 281$$

In chloroform solution, prominent infrared absorption maxima are observed at 2.83, 3.30, 3.37, 5.74, 5.84, 5.92, 6.04, 6.14, 6.85, 7.25, 7.38, 7.50, 7.80, 8.00, 8.51, 8.90, 9.17, 9.37, 9.50, 9.68, 10.19, 10.35, 11.20, 11.53, and 11.68 microns. This compound is inactive against *Sarcina lutea* at a concentration of 500 micrograms/ml.

EXAMPLE 8.—PREPARATION OF TETRAHYDRO-CHALCOMYCIN DIACETATE

Chalcomycin (0.896 g.) dissolved in 20 ml. of ethanol is shaken in contact with a hydrogen atmosphere at room temperature and atmospheric pressure in the presence of a 5% palladium on calcium carbonate catalyst. A catalyst of 5% palladium on carbon can also be used. After a consumption of about two moles of hydrogen per mole of chalcomycin, the catalyst is removed by filtration and the filtrate evaporated to dryness under reduced pressure. The residue is crude tetrahydrochalcomycin having less than 5% of the activity of chalcomycin against *Sarcina lutea*. A 250 mg. portion of this substance is dissolved in a mixture of 3 ml. of pyridine and 3 ml. of acetic anhydride. The solution is allowed to stand at room temperature for 48 hours and then evaporated to dryness under reduced pressure. By crystallization of the residue from aqueous methanol, there is obtained tetrahydrochalcomycin diacetate, M.P. 178–179° C. Observed microanalytical values are 58.79%, 58.70% carbon; 8.43%, 8.17% hydrogen. When determined in a potassium bromide disk, infrared maxima appear at 2.87, 3.40, 5.72, 5.84, 6.85, 7.24, 8.05, 8.28, 8.53, 8.87, 9.10, 9.34, 9.53, 9.96 and 10.36 microns. In ethanol solution, an ultraviolet absorption maximum is observed at 286 m$\mu$, $$E^{1\%}_{1\,cm.} = 0.63$$

This compound is inactive against *Sarcina lutea* at a concentration of 1 mg./ml.

EXAMPLE 9.—ACIDIC HYDROLYSIS OF CHALCOMYCIN

A solution of 908 mg. of chalcomycin in 40 ml. of 50% aqueous methanol, made 1-molar with respect to hydrochloric acid, is heated under reflux for 10 minutes. The methanol is removed by distillation under reduced pressure and the aqueous residue is extracted with three portions of chloroform. The combined chloroform extract is evaporated to dryness and the residue is crystallized from a mixture of isopropyl ether and acetone. This crystalline product obtained by acidic degradation of chalcomycin melts at about 187–189° C. and upon microanalysis is found to contain 60.35%, 60.19% carbon; 7.95%, 8.808% hydrogen. A ultraviolet absorption maximum appears at 308 m$\mu$, $$E^{1\%}_{1\,cm.} = 1.13$$

The infrared spectrum in a potassium bromide disk is characterized by absorption maxima at 2.90, 3.36, 3.43, 3.54, 5.80, 5.85, 5.93, 6.08, 6.87, 7.24, 7.35, 7.59, 7.90, 8.56, 8.76, 8.91, 9.21, 9.38, 9.56, 9.96, 10.26, 10.45, 10.87, 11.62, 12.54, 13.27 and 14.13 microns. This compound is inactive against *Sarcina lutea* at a concentration of 1 mg./ml.

EXAMPLE 10.—ALKALINE HYDROLYSIS OF CHALCOMYCIN

A solution of 10.3 g. of chalcomycin in 100 ml. of 50% aqueous methanol made 0.1-molar with sodium hydroxide is allowed to stand at room temperature for 24 hours. The methanol is removed by vaporization and the remaining aqueous mixture is washed with three portions of chloroform which are discarded. The aqueous residue is then acidified to pH 2 and extracted with 3 portions of chloroform. The combined chloroform solution obtained by extraction of the acidic medium is brought to dryness in a vacuum. The residue is crystallized from a mixture of isopropyl ether and methanol. This crystalline product obtained by alkaline degradation of chalcomycin melts at 273–276° C. and exhibits no significant ultraviolet absorption maximum from 220-300 m$\mu$. Microanalysis shows 59.13% carbon; 8.19% hydrogen; 31.83% oxygen. The infrared absorption spectrum determined in a potassium bromide disk shows prominent maxima at 2.85, 3.39, 5.65, 5.81, 6.85, 7.20, 7.40, 8.55, 8.83, 9.20, 10.00 and 10.37 microns. This compound is inactive against *Sarcina lutea* at a concentration of 1 mg./ml.

We claim:
1. Chalcomycin, a chemical compound having antibacterial activity which contains only the elements carbon, hydrogen and oxygen; assays for 59.56% carbon, 8.08% hydrogen, and 32.36% oxygen by difference; has a specific rotation $[\alpha]_D^{27} = -43.5°$ (c.=1% in ethanol); has a molecular weight of about 600; is relatively soluble in ethyl acetate, amyl acetate, methanol, ethanol, toluene, benzene, ethylene dichloride and chloroform; is slightly soluble in carbon tetrachloride, water and ether; is relatively insoluble in petroleum ether; decolorizes aqueous permanganate solution at room temperature; adds bromine in a carbon tetrachloride solution at room temperature; gives a positive hydroxamate test; gives a negative Tollens' test; gives a negative Fehling's test; gives a negative iodoform test; exhibits an ultraviolet absorption maximum at 218 millicrons and a shoulder in the 240 millimicron region in ethanol solution; exhibits prominent infrared absorption maxima at 2.83, 3.34, 3.40, 5.83, 5.89, 6.00, 6.13, 6.86, 7.23, 7.40, 7.53, 7.78, 8.00, 8.54, 8.70, 9.00, 9.22, 9.41, 9.67, 10.20, 10.71, 11.20, 11.57 and 11.69 microns in chloroform solution; exhibits prominent infrared absorption maxima at 2.84, 3.35, 3.40, 5.81, 5.89, 6.02, 6.12, 6.84, 7.20, 7.38, 7.51, 7.77, 8.08, 8.52, 9.22, 9.40, 9.63, 10.15, 11.19, 11.59 and 12.70 microns in a potassium bromide disk; is highly active in inhibiting the growth of *Sarcina lutea*; contains two hydroxyl groups which are esterified with acetic anhydride in pyridine at room temperature; is converted by such esterification procedure to the diacetate which is inactive against *Sarcina lutea* at a concentration of 500 micrograms per milliliter; is converted by hydrogenation in ethanol solution at room temperature and atmospheric pressure in the presence of a palladium catalyst to the hydrogenation product containing 4 additional hydrogen atoms, the said hydrogenation product forming by esterification with acetic anhydride in pyridine at room temperature the diacetate of the said hydrogenation product which is inactive against *Sarcina lutea* at a concentration of 1 milligram per milliliter; is converted by acidic hydrolysis to a transformation product which is inactive against *Sarcina lutea* at a concentration of 1 milligram per milliliter; and is converted by alkaline hydrolysis to a transformation product which is inactive against *Sarcina lutea* at a concentration of 1 milligram per milliliter.

2. Process for the production of chalcoamycin which comprises inoculating an aqueous nutrient medium containing sources of assimilable carbon and nitrogen with a chalcomycin-producing strain of *Streptomyces bikiniensis* and incubating the inoculated medium at a temperature from about 20 to 35° C. under aerobic conditions.

3. Process for the production of chalcomycin which comprises inoculating an aqueous nutrient medium having a pH between 6 and 8.5 and containing sources of assimilable carbon and nitrogen and added inorganic salt, with a chalcomycin-producing strain of *Streptomyces bikiniensis*; incubating the inoculated medium at a temperature from about 20 to 35° C. under aerobic conditions until substantial antibacterial activity is imparted to the medium; and isolating chalcomycin from the medium.

4. Process for the production of chalcomycin which comprises inoculating an aqueous nutrient medium having a PH between 6 and 8.5 and containing sources of assimilable carbon and nitrogen and added inorganic salt, with a chalcomycin-producing strain of *Streptomyces bikiniensis*; incubating the inoculated medium at a temperature from about 23 to 30° C. while agitating said inoculated medium and introducing sterile air thereinto, thereby causing the organism to develop as discrete particles dispersed throughout said medium; continuing the incubation under the aforesaid conditions until substantial antibacterial activity has been imparted to said medium; and separating the undissolved solid matter from the liquid of the resulting mixture thereby obtaining an aqueous solution containing a high concentration of chalcomycin.

References Cited in the file of this patent

Waksman: "Actinomycetes and Their Antibiotics," 1953, pp. 63–64, pub. by Williams and Wilkins, Balto., Md.

Liedberg et al.: Surg. Gyn. Obst., February 1955, pages 219–231.